May 25, 1948.  J. J. WILLIAMS  2,442,067
METHOD OF MANUFACTURING STOP NUTS
Filed April 1, 1944
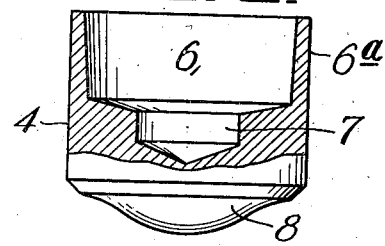
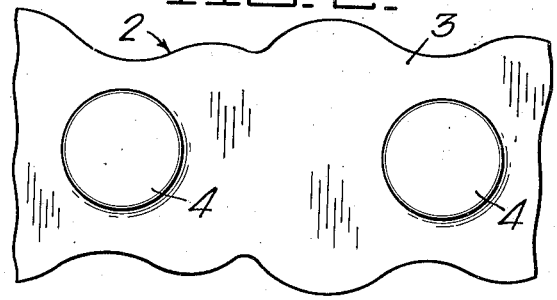
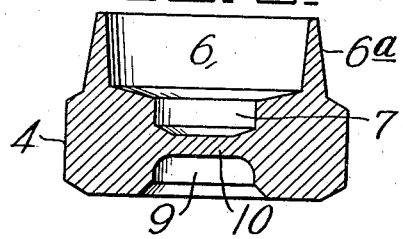
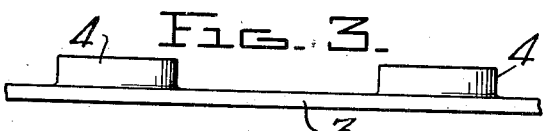
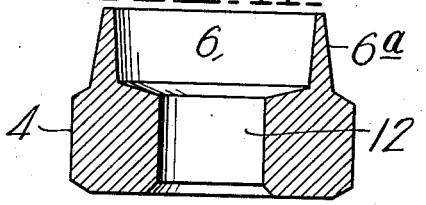
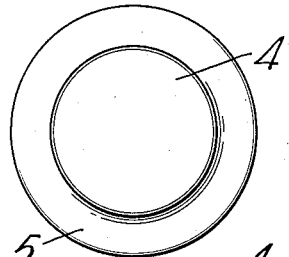
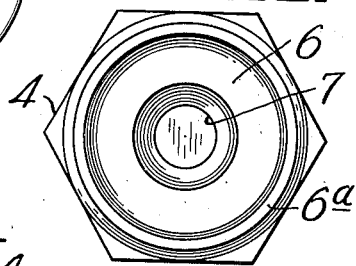
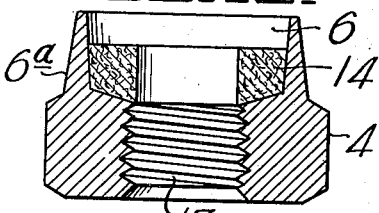
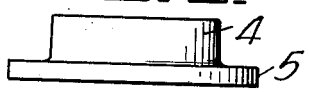
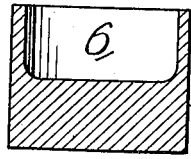
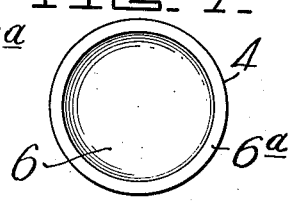
INVENTOR:
JOHN J. WILLIAMS,
by: R. E. Meeks
ATTORNEY.

Patented May 25, 1948

2,442,067

UNITED STATES PATENT OFFICE 2,442,067

METHOD OF MANUFACTURING STOP NUTS

John J. Williams, Meadville, Pa., assignor, by mesne assignments, to Perfection Patents Inc., Rochester, N. Y., a corporation of New York Application April 1, 1944, Serial No. 529,114

7 Claims. (Cl. 10—86)

This invention relates to the manufacture of nuts of the self-locking type, more commonly known as stop nuts, and particularly to elastic stop nuts, wherein a non-metallic unthreaded insert or washer having a bore less than the diameter of the thread of the bolt or screw with which the nut is intended to be used, is positioned in a counterbore portion or cylindrical recess of the nut body concentric and registering with the threaded bore of the nut.

The general object of the present invention is to provide a novel method of manufacturing stop nuts rapidly and economically from a strip of flat metallic stock thereby resulting in a materially decreased cost of manufacture.

It is another object of this invention to provide a new and improved method wherein stop nuts may be manufactured conveniently in a substantially continuous operation with a minimum amount of handling, thereby providing a method which is efficient and effective.

It is a more specific object of the present invention to provide a method of forming nut bodies for stop nuts from a continuous flat strip of metal by continuous successive coining, blanking, cupping and piercing operations, in order that the nut bodies may be quickly and inexpensively manufactured.

It is also among the objects of this invention to provide a novel method of forming the counterbore or cup-like portion in the nut body of a stop nut, for receiving the non-metallic or elastic insert or washer.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 1 is a fragmentary plan and cross-sectional view of the strip of metal from which the nut bodies are to be formed;

Fig. 2 is a plan view of a portion of the metal strip showing protuberances or hubs formed thereon during the coining operation for a number of nut bodies;

Fig. 3 is a side elevational view of the strip as shown in Fig. 2;

Fig. 4 is a plan view of a nut body after it has been cut or blanked from the coined strip, shown in Figs. 2 and 3;

Fig. 5 is an elevational view of the nut blank as shown in Fig. 4;

Fig. 6 is a cross-sectional view of the nut body after the flange portion of the nut body has been bent inwardly or cupped to form the counterbore portion or cylindrical recess in the nut body for receiving the non-metallic insert or washer;

Fig. 7 is a top view of the nut body as shown in Fig. 6;

Fig. 8 is a cross-sectional view of the nut body after the next operation thereon, showing the bottom of the cupped portion recessed or countersunk and the opposed end of the body chamfered;

Fig. 9 is a cross-sectional view through a nut body after the next operation thereon showing the body hexagonally formed with a recess or countersink in the outer end thereof directly opposite the recess or countersink in the cupped portion;

Fig. 10 is a plan view of the nut body as shown in Fig. 9;

Fig. 11 is a cross-sectional view through the nut body after the same has been pierced or the hole has been formed therethrough;

Fig. 12 is a cross-sectional view through the nut body after the next succeeding operations showing the hole therethrough as being threaded with a non-metallic washer positioned in the counterbore or cupped portion thereof; and Fig. 13 is an elevational view partly in section of the completed stop nut, showing the upper end of the cupped portion bent or curled inwardly thereof into engagement with the non-metallic washer.

Referring more particularly to the drawings, the nut body is formed preferably from an elongated strip of metal 2, having a rectangular-shaped cross-section, as shown in Fig. 1 of the drawings. The thickness of the strip 2 is reduced as at 3, and there is formed on one side thereof, a plurality of spaced-apart solid thickened portions or protuberances by flowing the metal preferably with the aid of dies, in a manner similar to that employed in coining processes, so as to provide a continuous strip having circular solid thickened portions or hubs arranged thereon at spaced intervals throughout the length thereof, as shown in Figs. 2 and 3 of the drawings. Such a coining press is well known in the art and consequently the machine or press adapted to be employed is not illustrated.

After the coining operation, the strip of metal is fed into and through a series of dies, wherein different operations are progressively performed in order to provide a nut body. In the first operation after the coining, as shown in Figs. 4 and 5 of the drawings, each of the thickened coined portions is blanked or cut from the strip so as to provide a circular disk-like blank or member having a central circular solid thickened portion with a relatively thin circular flange portion arranged therearound substantially concentric therewith. In other words, each of the thickened portions is blanked out of the strip together with a portion of the flattened material therearound so as to provide a symmetrical disk-like blank or member having a cylindrical hub portion.

In the next step, the blank, shown in Figs. 4 and 5, is forced preferably downwardly through a die by means of a punch, so that the flange portion 5 thereof is forced or drawn inwardly and upwardly and extends longitudinally of the thickened portion 4 so as to provide a hollow portion or cylindrical recess 6 on one end thereof, having a relatively thin outer wall 6a. That is to say, the flange portion 5 is drawn and formed to substantially the same diameter as the thickened portion 4 so as to provide a cylindrical cup-like nut body member, as shown in Figs. 6 and 7 of the drawings.

In order to produce a nut body having a uniform height, it is necessary to set the cup portion or cylindrical recess 6 therein and this constitutes the next operation, as shown in Fig. 8 of the drawings. In other words, the depth of the cylindrical recess 6 is set preferably by another punching operation so that the height of the rim or outer wall 6a around the hollow portion or recess is uniform. Preferably during this setting operation there is formed in the bottom of the recess 6 concentric therewith, preferably a recess or countersink 7 for a purpose hereinafter to be described. It will be understood that the nut body, as shown in Fig. 8, still has a cylindrical shape at this point in the fabrication. If it is desired to produce a polygonal-shaped nut, such as a hexagonal nut, the opposite or lower end of the nut body is preferably chamfered, as at 8, at the time of the cup-setting, so that sufficient metal is provided at this point for the polygonal or hexagonal shape and so that the metal will flow more easily in the forming dies.

To form a polygonal or hexagonal-shaped nut in the next operation, the chamfered portion 8, together with the base or polygonal portion 4 of the nut body, is upset so as to provide a polygonal or hexagonal-shaped nut body, as shown in Figs. 9 and 10. During the hexagonal shaping of the nut body, the base or thickened portion 4 thereof is preferably recessed or countersunk as at 9 centrally thereof on the end opposite that from the hollow portion or recess directly opposite and in axial alignment with the countersink or recess 7 in the bottom of the hollow portion 6 so as to provide a relatively thin portion 10 centrally of the nut body between the countersinks 7 and 9.

In the next operation the nut body is pierced centrally thereof or drilled so as to remove the relatively thin portion 10 from the nut body, thereby providing a hole 12 therethrough whereby a tubular nut body member is provided. The countersinks 7 and 9 act to guide and position the punch centrally of the nut body during the piercing operation. It will be seen that by providing the relatively thin wall 10 between the countersinks 7 and 9, the slug which is pierced therefrom is relatively thin, thereby reducing the amount of waste or scrap resulting from the piercing or drilling operation, to a minimum. The operations on the blank or nut body, as shown in Figs. 4 through 11, are performed perferably in a Baird press, a type of press which is well known to those skilled in the art. In other words, the strip as shown in Figs. 2 and 3 of the drawings, after the coining operation thereon, is fed continuously into and through a press wherein the blanks are progressively cut or blanked from the continuous strip, as shown in Figs. 4 and 5, then cupped, as shown in Figs. 6 and 7, with the cup set and countersunk, as shown in Fig. 8, then hexagonally formed and countersunk, as shown in Figs. 9 and 10, and finally pierced, as shown in Fig. 11, so as to provide a tubular nut body. Thus, it will be seen that when the nut bodies leave the press, they are completely formed and ready to be threaded and assembled.

In the next operation, the hole 12 through the nut body is threaded as at 13. Such tapping or threading may be performed on a conventional type dial feed tapping machine. After the nut body has been threaded a washer 14 made preferably from a non-metallic, elastic or fiber material is positioned in the cylindrical recess or hollow portion 6, as shown in Fig. 12 of the drawings, a practice well known in the art. After the washer 14 has been positioned in the recess, the outer edge of the wall 6a, which was formerly the flange of the blank, is forced or curled inwardly as at 15, of the hollow portion or cylindrical recess 6, as shown in Fig. 13 of the drawings, into engagement with the washer 14, so as to hold securely the same in position therein, so as to prevent turning or displacement thereof from the nut body.

As a result of my invention, it will be seen that there is provided a simple and relatively inexpensive method of manufacturing stop nuts by substantially a continuous process. It will also be seen that in practicing my improved method it is not necessary to employ expensive tools or equipment and that the nut body can be conveniently formed in a progression die. It will also be seen that the present invention provides a method whereby such nuts may be produced rapidly and inexpensively with a minimum number of manufacturing operations and with an extremely less waste of material than by other methods heretofore suggested and used.

It will be apparent that a wide variety of nut shapes may be fabricated in the practice of the present invention. While there is shown for the purpose of illustration, the fabrication of a hexagonal nut, it will be seen a square or other polygonal-shaped nut may be provided according to the teachings of the present invention.

While I have shown and described a specific embodiment of my invention, it will be understood that this embodiment is merely for the purpose of illustration and description and that various other forms may be devised within the scope of my invention as defined in the appended claims.

What I claim as my invention is:

1. In the manufacture of nuts of the class described, the steps including forming a blank having a solid thickened center portion with a laterally extending flange portion arranged therearound, bending the flange portion inwardly and upwardly substantially concentric and coincident with said solid thickened portion so as to provide a hollow portion at one end thereof whereby a cup-like body member is provided, forming a chamfered portion on the end of said thickened portion opposite that from said hollow portion, upsetting said chamfered and said thickened portions so as to provide a polygonal body member, positioning a washer in said hollow portion, and then bending the outer edge of said upwardly bent portion inwardly of said hollow portion into engagement with the washer therein.

2. In the manufacture of nuts of the class described, the steps including forming a blank having a solid thickened center portion with a laterally extending flange portion arranged therearound, bending the flange portion inwardly and upwardly substantially concentric and coincident with said solid thickened portion so as to provide a hollow portion at one end thereof whereby a cup-like body member is provided, forming a chamfered portion on the end of said thickened portion opposite that from said hollow portion, upsetting said chamfered and thickened portions so as to provide a polygonal body member, forming an opening through said thickened portion substantially concentric with said hollow portion so as to provide a tubular body member, tapping said opening so as to provide a threaded portion in said body member, positioning a washer in said hollow portion, and finally bending the outer edge of said upwardly bent portion inwardly of said hollow portion into engagement with said washer so as to hold securely the same in position therein.

3. The method of making nuts of the class described which comprises successively coining, upon one face of a piece of flat metal stock, a solid thickened circular portion, blanking out said coined thickened portion together with a portion of the material therearound so as to provide a circular disk-like blank having a solid thickened circular center portion with a thinner circular laterally extending flange portion therearound substantially concentric therewith, bending the flange portion inwardly and in a direction opposite to the direction in which said thickened portion projects from said face, so as to extend longitudinally of said thickened portion substantially concentric therewith whereby a hollow portion is provided on one end of said thickened portion, forming a chamfered portion on the end of said thickened portion opposite that from said hollow portion, upsetting said chamfered and thickened portions so as to provide a polygonal body member, positioning a washer in said hollow portion and then bending the outer edge of said inwardly bent portion inwardly of said hollow portion into engagement with the washer therein.

4. The method of making nuts of the class described which comprises successively coining, upon one face of a piece of flat metal stock, a solid thickened circular portion, blanking out said coined thickened portion together with a portion of the material therearound so as to provide a circular disk-like blank having a solid thickened circular center portion with a thinner circular laterally extending flange portion therearound substantially concentric therewith, bending the flange portion inwardly so as to extend longitudinally of said thickened portion substantially concentric and a coincident therewith whereby a hollow portion is provided on one end of said thickened portion, forming a chamfered portion on the end of said thickened portion opposite that from said hollow portion, upsetting said chamfered and thickened portions so as to provide a polygonal body member, forming an opening through said thickened portion substantially concentric with said hollow portion so as to provide a tubular body member, tapping said opening so as to provide a threaded portion in said body member, positioning a washer in said hollow portion, and finally bending the outer edge of said inwardly bent portion inwardly of said hollow portion into engagement with said washer so as to hold securely the same in position therein.

5. The method of making nuts of the class described which comprises forming a solid thickened portion centrally on a sheet of material, cutting the thickened portion from said sheet together with a portion of the material therearound so as to provide a disk-like blank having a solid thickened center portion and a thinner laterally extending flange portion therearound substantially concentric therewith, bending the flange portion inwardly so as to extend longitudinally of said thickened portion substantially concentric and coincident therewith whereby a hollow portion is provided on one end of said thickened portion, forming cylindrical countersinks in said thickened portion on opposed sides thereof in axial alignment with each other so as to provide a relatively thin portion centrally of said thickened portion, piercing out said relatively thin center portion from said thickened portion so as to provide a circular hole therethrough substantially concentric with respect to said hollow portion whereby a tubular body member is formed, tapping said hole so as to provide a threaded portion therein, placing a washer in the hollow portion of said body member, and finally bending the outer edge portion of said inwardly bent portion inwardly of said hollow portion so as to retain the washer in position therein.

6. The method of making nuts of the class described which comprises forming a solid thickened circular portion centrally of a sheet of material, cutting the thickened portion from said sheet together with a portion of the material therearound so as to provide a circular disk-like blank having a solid thickened circular center portion and a thinner circular laterally extending flange portion therearound substantially concentric therewith, bending the flange portion inwardly so as to extend longitudinally of said thickened portion substantially concentric and coincident therewith whereby a hollow cup-like portion is provided on one end of said thickened portion, upsetting said thickened portion so as to provide a hexagonal-shaped body member, forming cylindrical countersinks in said thickened portion on opposed sides thereof in axial alignment with each other so as to provide a relatively thin portion centrally of said thickened portion, removing said relatively thin center portion from said thickened portion so as to provide a circular hole therethrough substantially concentric with respect to said hollow portion whereby a tubular body member is formed, tapping said hole so as to provide a threaded portion therein, placing a washer in the hollow portion of said body member, and finally bending the outer edge portion of said inwardly bent portion inwardly of said hollow portion so as to retain the washer in position therein.

7. In the manufacture of a nut of the class described, the steps including forming a blank having a solid circular thickened portion with a laterally extending relatively thin circular flange portion arranged therearound substantially concentric therewith, bending the flange portion inwardly and upwardly so as to extend longitudinally of and substantially coincident with said thickened portion and so that the outer diameter of said bent up portion is substantially equal to that of said thickened portion whereby a cylindrical body member is provided having a relatively thin walled washer receiving circular recess arranged at one end thereof, upsetting said thickened portion so as to provide a polygonal shaped portion on that end of the body member, forming a threaded hole through said thickened portion substantially concentric therewith and with said recess, positioning a washer in said recess, and bending the outer edge of the wall of said recess inwardly thereof into engagement with said washer so as to hold securely the same in position therein.

JOHN J. WILLIAMS.

REFERENCES CITED

The following references are of record in the file of this patent:

UNITED STATES PATENTS

| Number | Name | Date |
| --- | --- | --- |
| 321,260 | Tillotson | June 30, 1885 |
| 1,550,282 | Rennerfelt | Aug. 18, 1925 |
| 1,714,661 | Crawford | May 28, 1929 |
| 1,936,598 | Handler | Nov. 28, 1933 |
| 1,990,718 | Swanstrom | Feb. 12, 1935 |
| 1,993,137 | Gibney | Mar. 5, 1935 |
| 2,002,671 | McLaughlin | May 28, 1935 |
| 2,153,681 | Swanstrom | Apr. 11, 1939 |
| 2,206,740 | Burke | July 2, 1940 |
| 2,346,456 | Ruthven | Apr. 11, 1944 |
| 2,351,057 | Luce | June 13, 1944 |